United States Patent [19]

Berding

[11] 3,794,819

[45] Feb. 26, 1974

[54] ERROR CORRECTION METHOD AND APPARATUS

[75] Inventor: Andrew R. Berding, San Jose, Calif.

[73] Assignee: Advanced Memory Systems, Inc., Sunnyvale, Calif.

[22] Filed: July 3, 1972

[21] Appl. No.: 268,491

[52] U.S. Cl....235/153 AM, 340/146.1 AG, 174 ED, 174.1 B

[51] Int. Cl............................................ G11c 29/00

[58] Field of Search... 235/153 AM, 340/146.1 AG, 340/146.1 F, 174 ED, 174.1 B

[56] References Cited

OTHER PUBLICATIONS

Schuenemann, C. H. et al. Correction of Single Errors by Double Parity Check. In IBM Tech. Disc. Bull. 13(5): pp. 1324–1325. Oct. 1970.

*Primary Examiner*—Malcolm A. Morrison
*Assistant Examiner*—R. Stephen Dildine, Jr.
*Attorney, Agent, or Firm*—Spensley, Horn & Lubitz

[57] ABSTRACT

An improved error correction method and apparatus which is capable of correcting single digital errors and capable of detecting multiple errors. In accordance with the invention as used in a memory system, a plurality of storage cards are used, each organized so as to provide a single data output and a data valid output, the data valid output being determined as a result of a parity check of a multiple bit memory signal from which the data output is selected as a result of further addressing. Similarly, one further storage card is used to provide a single parity check signal for the data signals from the other storage cards and to provide a parity valid signal in the same manner as the data valid signals. By applying these various signals to a gating system, an error in any one of the signals may be detected, and if in a data signal, may be corrected. Multiple errors may similarly be detected and noted by the provision of a signal indicating such multiple errors.

4 Claims, 5 Drawing Figures

ERROR CORRECTION METHOD AND APPARATUS

BACKGROUND OF THE INVENTION

1. Field of the Invention

The present invention relates to digital systems, and particularly to methods and apparatus for detecting and correcting errors in signals occurring in digital systems.

2. Prior Art

Digital systems, such as digital computers and the like are characterized by the storage, manipulation and transfer of a plurality of signals, each having one of only two possible or allowed states. These binary signals, in specific combinations, may represent numbers, letters or other symbols in accordance with a predetermined code, and further may represent data to be processed, commands for processing data, or addresses for the location of data or commands for processing. Since the serial transmission of the binary information on a single line would in general be inefficient and too time consuming, it is common to provide a plurality of signal lines, each of which serially present binary signals (data bits) and together simultaneously present a plurality of data bits.

A group of nine signal lines may simultaneously present nine bits of information, which by common usage is referred to as a byte. Eight of the nine signals represent data bits and the ninth signal is characteristically a parity signal. The parity signal transmitted with each eight bit signal is selected in accordance with the state of the eight data bit signals, so that when all signals are added together, including the parity signal, either an odd or an even number will be obtained, depending upon the convention used. Thus, if an even parity check is used, if the number of ones in the eight data bit signals is odd, the parity bit should also be a one, so as to make the sum even. In this way a single error in any of tbe nine signals will result in a failure to obtain a proper parity check when the nine signals are added together, thereby providing a means for detecting a single error. However, if two errors occur, or for that matter, any even number of errors occur in the nine signals, a parity check may still be obtained and thus the presence of the errors will go undetected.

It is extremely important to the reliable operation of a digital device, such as a digital computer that the accuracy and reliability of the data storage, tansfer, etc., be extremely high, since a single error may be catastrophic to the proper operation of the device. By way of example, in a digital computer, a byte might represent a part of a number or a part of a memory address. If an error occurs in the least significant digit of the number, the result may be inconsequential. On the other hand, if an error occurs in an address signal, the result probably will result in a gross error, since the information stored in the inproperly addressed location, in most cases, will have no relation to the information stored in the location which should have been addressed. Consequently, while present day digital equipment is highly reliable compared to most other types of equipment, single errors do occasionally occur, and even though such errors may be detected by the parity check, above described, the utility of the equipment will be diminished unless such errors may also be automatically corrected without operator assistance. Consequently, methods have been devised and are often used for not only detecting a single error, but for automatically correcting the error so that a single error does not require operator assistance. Codes which generally achieve this result are referred to as Hamming Codes.

By way of example, while M bits provide $2^M$ possible combinations, an additional number of bits K may be provided, so as to effectively provide sufficient redundancy in the information so that a single error may be detected, isolated and corrected. Such a code is described in detail in Logical Design of Digital Computers, published by John Wiley & Sons, Inc., 1959, starting on page 326. It is shown therein that the number of additional bits K required to allow isolation and correction of a single error in a number of bits M must be such that $2^K$ is greater than or equal to $M + K + 1$. Thus, for a conventional byte of eight data bits, four Hamming bits must be provided. In addition, a simple parity check bit is also generally provided since the Hamming Code requires a certain amount of data processing which is time consuming and not warranted unless a simple parity check indicates that an error exists. Furthermore, though a simple parity check cannot detect a double error, the above Hamming Code could not correct such an error anyway. Thus, if a Hamming system is used, an eight data bit byte characteristically will have a five bit error correcting signal therewith, making the entire byte a thirteen bit byte.

It is apparent from the above that a Hamming Code requires a significant number of bits to be associated with a given number of data bits so that a single error may be detected and corrected. Consequently, in applications where a plurality of bytes constitute a word, the Hamming Code may be applied on a per word basis rather than a per byte basis so as to result in a lower percentage of error correcting its required. However, this of course also increases the probability of a double error occurring within the group of bits covered by the Hamming bits. Also, the use of the Hamming Code degrades data transfer time since it requires many decision levels to isolate and correct a single error. Consequently, there is a need for a simple error detecting and correcting system which will require a minimum number of error correcting bits to be associated with a data signal, and which will require a minimum number of operations to detect, isolate and correct single errors as well as to detect and note the occurrence of double errors.

BRIEF SUMMARY OF THE INVENTION

An improved error correction method and apparatus which is capable of correcting single digital errors and capable of detecting multiple errors. In accordance with the invention as used in a memory system, a plurality of storage cards are used, each organized so as to provide a single data output and a data valid output, the data valid output being determined as a result of a parity check of a multiple bit memory signal from which the data output is selected as a result of further addressing. Similarly, one further storage card is used to provide a single parity check signal for the data signals from the other storage cards and to provide a parity valid signal in the same manner as the data valid signals. By applying these various signals to a gating system, an error in any one of the signals may be detected, and if in a data signal, may be corrected. Multiple errors may similarly be detected and noted by the provision of a signal indicating such multiple errors. The present invention error correction method, in comparison to a Hamming Code, requires the dedication of a much smaller percentage of a memory capacity to the storage of error detecting and correcting bits, and further allows not only for the correction of a single error but the detection of double errors, commonly not achieved with Hamming Codes. These advantages are obtained by a shorter or simpler manipulation of the required information, thereby allowing the apparatus of the present invention to operate at higher speeds than apparatus for the processing of Hamming Codes. In general, the logic devices and the memory devices used to fabricate the present invention apparatus are all independently well-known in the prior art.

DETAILED DESRIPTION OF THE INVENTION

The present invention Error Correction Method and Apparatus is best described with reference to a specific embodiment thereof, as used for a specific purpose. Therefore, in the detailed description to follow, the organization and circuits to provide the error correction as may be utilized in a memory system shall be described in detail, it being understood that the error detection and correction technique may be utilized in other forms and in other digital systems or sub-systems to detect and correct errors occurring in digital data.

Figure 1:
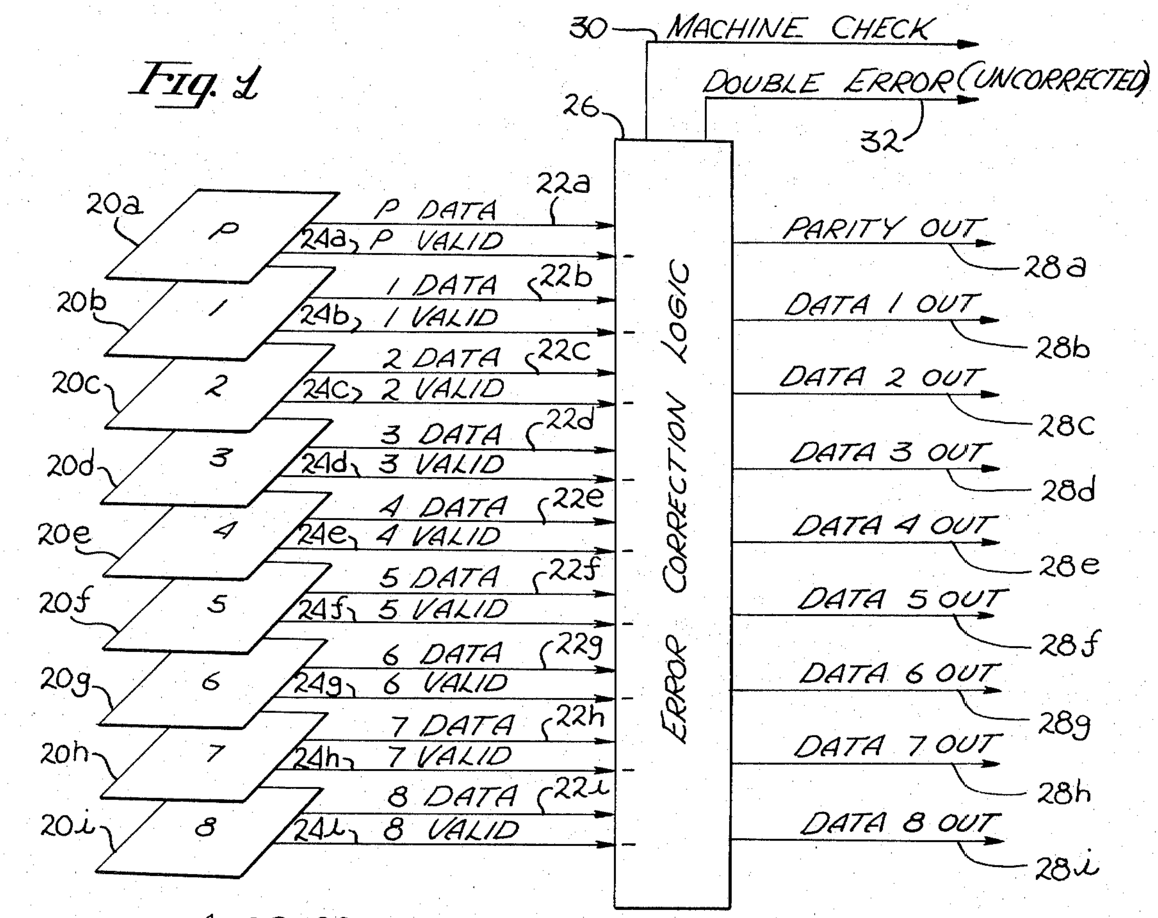
FIG. 1 is a block diagram illustrating the overall organization of a typical memory using the error correction logic of the present invention.

First, referring to FIG. 1, the general organization of a memory system and its interconnection to the error correction logic may be seen. The memory system is comprised of a plurality of memory cards 20*a* through 20*i*, each of which, when properly addressed (addressing not being shown), will provide a single data bit output on lines 22*a* through 22*i* respectively, and a single data valid bit on lines 24*a* through 24*i*. These outputs, the function of which shall be subsequently described, are coupled to the error correction logic 26 which provides a plurality of outputs 28*a* through 28*i*, with outputs 28*b* through 28*i* representing a typical eight bit byte and the output on line 28*a* representing a parity check bit for the eight bit byte. Also provided as outputs from the error correction logic 26 is a signal on line 30 indicating that a double error of a certain character has been detected and a signal on line 32 indicating that a potential double error of another type has been detected. The signal on line 32 indicates a potential error which may exist in the data, but which is not correctable by the error correction logic. Actually, the indication on line 30 indicates a definite problem in the data, while the double error indication on line 32 only signifies that errors have perhaps occurred (since the error detected may exist in data other than that being transferred at the time and therefore may not effect the validity of the output signals on lines 28*a* through 28*i*).

Figure 2:
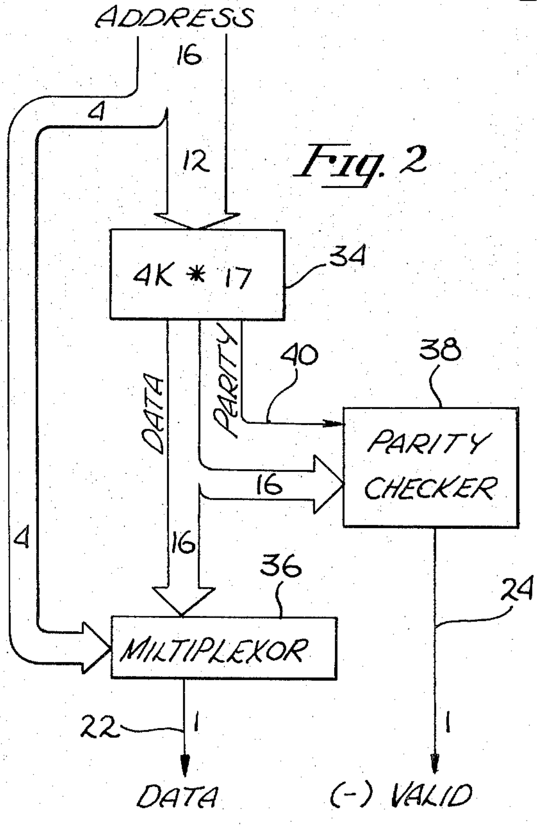
FIG. 2 is a diagram illustrating the internal organization of each of the memory cards of FIG. 1.

Now referring to FIG. 2, a flow diagram illustrating the organization of each memory card 20*a* through 20*i* of FIG. 1 may be seen. In this particular embodiment, the basic memory unit 34 is a 69,632 bit memory having a 4,096 × 17 bit organization. Thus, with a 12 bit address signal applied thereto, one of 4,096 groups of seventeen bits may be addressed and presented on the output lines of the memory unit. Of course, typically the memory unit 34 will be constructed of a plurality of smaller memory units, such as a plurality of semiconductor memories coupled to the addressing and output lines so as to effectively perform as a 4,096 × 17 bit memory. The interconnecting and addressing of memory devices of a given organization to provide a larger memory capacity of a specific desired apparent organization is well-known in the prior art, and thus one skilled in the art may readily fabricate the memory 34 from commercially available memories such as semiconductor memories.

Figure 3:
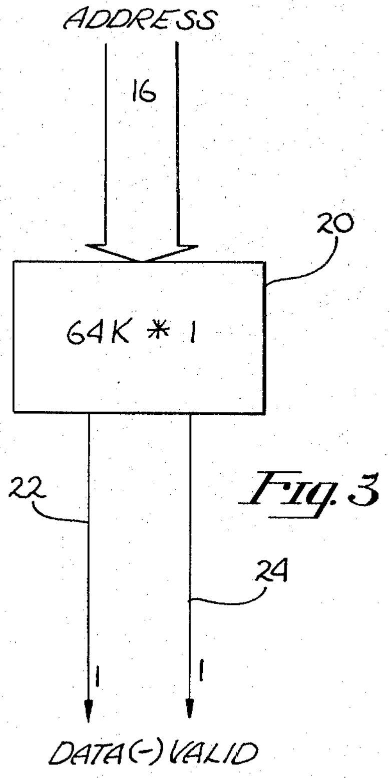
FIG. 3 is a diagram illustrating the apparent organization of the memory card of FIG. 2 from an external input-output point of view.

Thus, it may be seen that upon receipt of a 12 bit addressing signal, memory 34 provides a 17 bit output, 16 of which are communicated to multiplexer 36 as well as to the parity check 38, whereas the 17th bit on line 40 is coupled only to the parity checker. The parity checker 38 is of conventional design and uses the information on line 40 to provide a parity check of the other 16 bits and to provide a valid (or invalid) indication on line 24 (e.g., lines 24*a* through 24*i* for the nine memory cards). An additional four address bits are coupled to multiplexer 36 so as to provide for the further decoding of the 16 data signals coupled thereto to selectively provide a single one of the data bit signals on the output line 22. Thus, with this organization of each of the memory cards, it may be seen that effectively the addressing of a single bit data bit, stored in memory 34, is accomplished in two stages, first by a partial addressing of the memory to provide a plurality of data bits together with a single parity bit so that the parity check may be done on the partially addressed signal, and then by the further addressing to select one data bit from the plurality of previously addressed data bits to provide a single data bit output for the memory card. Thus, referring to FIG. 3, the apparent organization from an external view of each memory card 20*a* through 20*i* is a memory with a 65,536 ($2^{16}$) bit by one bit organization which provides, in response to a 16 bit address signal, a single data bit output on line 22 together with a data valid output on line 24 indicating the veracity of the signal on line 22.

A number of characteristics of the particular organization shown in FIG. 2 may now be noted. Since the parity check is conducted on a multiple bit signal from which a single bit is selected, a failure to obtain a parity check may be due to an error in the parity signal on line 40 or may be due to an error in one of the unselected data bits. Thus, a failure to obtain a parity check as indicated by the signal on line 24 is indicative not of the invalidity of the data appearing on line 22, but only that the data on line 22 is subject to question, and in fact, based on the specific organization shown in FIG. 2, has a probability of 16/17 of still being correct. Thus, assuming that one error may exist in the intermediate seventeen bit signal received from the memory element 34, the following possibilities arise:

1. The error exists in the parity bit signal or in one of the 15 data bit signals not selected for presentation on line 22, thereby resulting in the correct signal appearing on line 22 and an indication on line 24 that the signal on line 22 may be incorrect.

2. If the error exists in the selected data bit, the signal presented on line 22 will be in error and the signal on line 24 will indicate a lack of parity check. Thus, in any event, for a single error in the partially decoded signal, a data invalid signal will appear on line 24 and the data signal on line 22 may or may not be in error. In the event that there are two errors in the partially decoded seventeen bit signals received from the memory element 34, a parity check will be obtained as indicated by the signal on line 24, although the data appearing on line 22 may in fact be in error.

It is to be noted that the external appearance of each memory card is such that $2^{16}$ data bit signals as well as $2^{16}$ valid signals are addressable through a 16 bit address, thereby at least suggesting a $2^{17}$ bit memory capacity, whereas in reality, the memory capacity used to provide these signals is merely $2^{16} + 2^{12}$ bits, thereby devoting only approximately 6 percent of the memory capacity per card to the creation of the data valid signals on lines 24 rather than one-half of the memory capacity of the cards.

The function of error correction logic 26 (FIG. 1) to be subsequently described in detail is as follows:

The error correction logic performs a parity check on the nine signals appearing on lines 22*a* through 22*i* to determine whether parity of the nine signals is correct. For this purpose, one of the nine memory cards, specifically memory card 20*a*, provides the parity signal for eight data signals on lines 22*b* through 22*i* of the other eight memory cards. The error correction logic also evaluates the valid signals appearing on lines 24 coming from each card to determine whether all signals provide valid indication, one signal is providing an invalid indication, or more than one signal is provided an invalid indication. Thus, for the specific error correction logic circuits of FIGS. 4*a* and 4*b*, the possibilities in terms of the formation provided to the error correction logic from the memory cards are: all combinations of good and bad data parity, taken with all signals valid, one signal invalid and more than one signal invalid. The error correction logic combines this information to provide the outputs as indicated in the table below:

TABLE 1

ERROR CORRECTION LOGIC

| Data Parity | Valid Signals | Outputs (lines 28*a*–28*i*, 30&32) |
|---|---|---|
| Good | All valid | 8 data bits and parity bit as received |
| Good | One Invalid | 8 data bits and parity bit as received |
| Good or Bad | More than one invalid | Double error signal plus 8 data bits and parity bit as received |
| Bad | All valid | Machine check signal, line 32, double error signal, line 30, plus 8 data bits and parity bit as received |
| Bad | One invalid | Inverted bit for one indicated as invalid and other 8 bits (7 data + parity or 8 data) as received |

When the data parity is good and all signals are valid, the eight data bits and the parity bit are presented on lines 28*a* through 28*i* as received from the memory cards. While the output data may in fact be in error, a minimum of four errors would be required to create such a situaion; specifically, for the data parity to be good, two errors in the data signals appearing on lines 22*a* through 22*i* would be required, together with two additional errors, one on each of the two cards, within the other 16 bits of the 17 bit signal (see FIG. 2) from which the data bit is selected. These second two errors would be necessary to provide a parity check in the parity checker 38 on each of these two cards. The probability of occurrence of four errors in such a manner is extremely remote.

If the data parity is good, but one of the valid signals indicates a potentially invalid condition, the eight data bits and the parity bit are coupled to the output as received. The one invalid signal indicates a lack of parity check for the sixteen bits (or the parity bit) from which the data bit was selected on that card, but the fact that data parity is good indicates that the error on the one card occurred not in the data bit selected, but in the other fifteen data bits or the parity bit for that card, thereby not requiring a correction. Of course, two additional errors could occur on that or on any other one card, one of which might occur in the selected data bit for that card. This would result in an erroneous valid signal from that card. However, data parity would not check. Consequently, it may be seen that two additional errors are also required on any card, one of which is in the selected data signal, so as to result in data parity checking out. Thus, in order for the eight data bit and the parity bit, as received, to be in error for this combination, at least five errors are required, again extremely remote.

If data parity is bad, but all of the signals on lines 24*a* through 24*i* indicate the data to be valid, the error correction logic again couples the eight data bits and the parity bit as received to the output, but in addition, generates a double error signal and a machine check signal which may be used to record the transmitted information for later examination, to generate a command stop signal for the digital equipment etc. On this condition, since data parity is bad, one data bit must be in error, but since parity of the seventeen bits on each card check, there must also be a second error on the same card having the erroneous data signal. Thus, a minimum of two errors must exist on a single card, one of which is in the data bit selected by the multiplexer 36 for that card. While the error correction logic cannot sense which data bit is in error, and therefore cannot correct the error, it does provide an indication of the existence of the error which may be used in a variety of ways depending upon the nature of the equipment and the end result desired. By way of example, in certain situations, information could not be repeated so that notation of the double error merely provides an indication of lack of confidence in tbe data, whereas in other situations the data might be repeated to determine the source of the error, etc.

If data parity is bad and one of signals 24*a* through 24*i* indicates an invalid condition, the error correction logic inverts the signal on the respective one of lines 22*a* through 22*i* and presents this inverted signal together with the eight other bits (which may be seven data bits and the parity bit, or the eight data bits if the error occurred in the parity bit) as received. In this situation, it is most likely that data parity is bad because the one data signal is incorrect, thereby disturbing the overall data parity as well as the valid signal, that is, the data parity for the respective card. Consequently, the inversion of the data signal for the card indicating the invalid condition corrects the error and data processing may proceed without incident. Of course, the single invalid signal may result from an error on the respective card not in the selected data bit, but in one of the other 16 bits so that the data being communicated therefrom is, in fact, not in error and should not have been inverted. However, data parity would have checked unless a selected bit from another card was also in error which in turn would have resulted in an invalid signal from that card unless there were still an additional error in that card. Thus, a minimum of three errors would be required to occur in a specific manner before an error correction logic output error would occur.

If more than one of the signals on line 24*a* through 24*i* indicate that the data on the respective ones of lines 22*a* through 22*i* is potentially invalid, the error correction logic cannot correct the error, but instead a double error signal is again created and the eight data bits and one parity bit are coupled directly to the error correction logic output. It should be noted however, that the nine output signals do not necessarily have an error in them since the errors occurring on the questionable cards may occur, and in fact, probably do occur in the nonselected bits on that card.

Figure 4A:
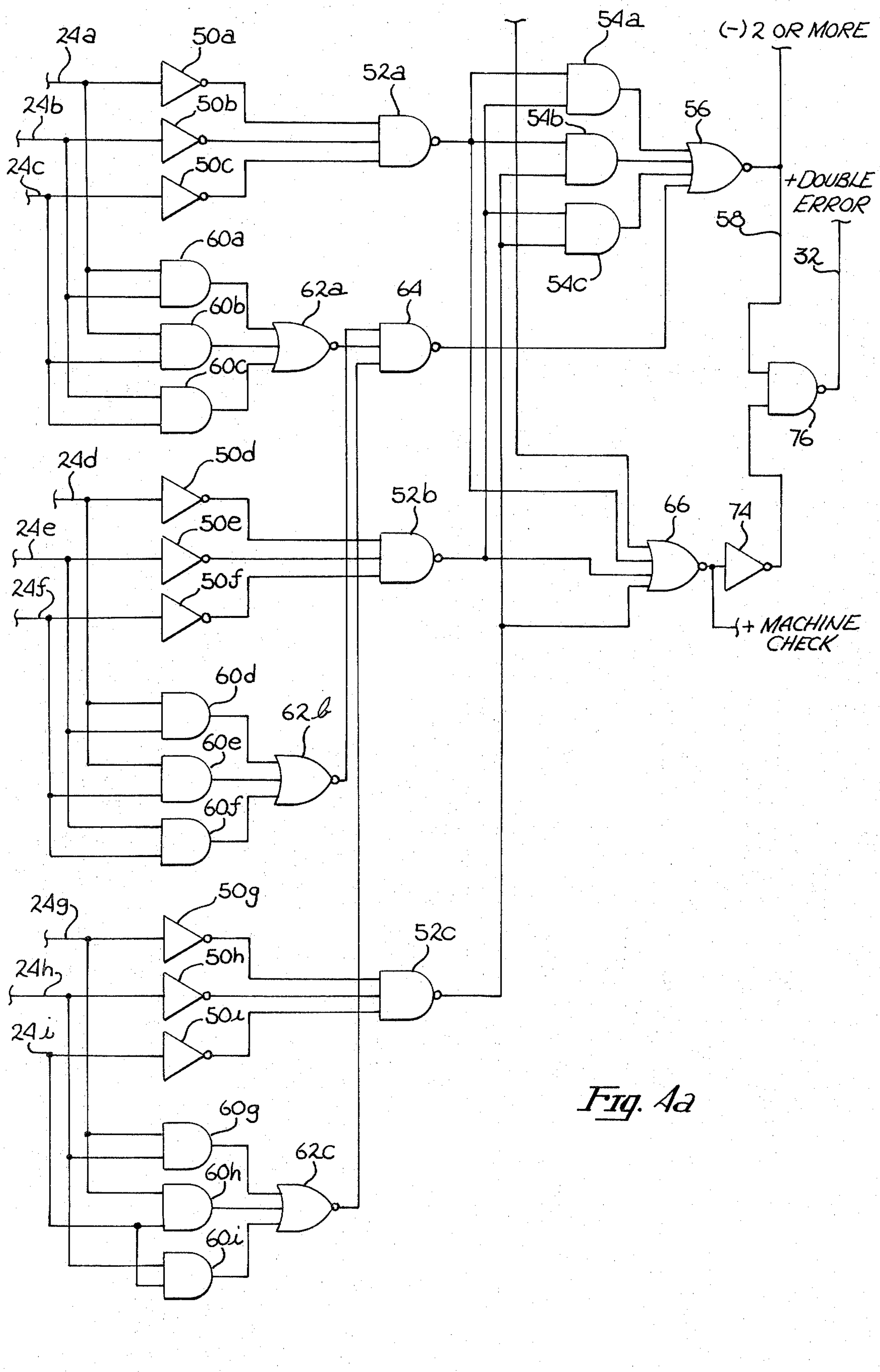
FIG. 4*a* is a portion of the logic diagram for the present invention error correction logic.
Figure 4B:
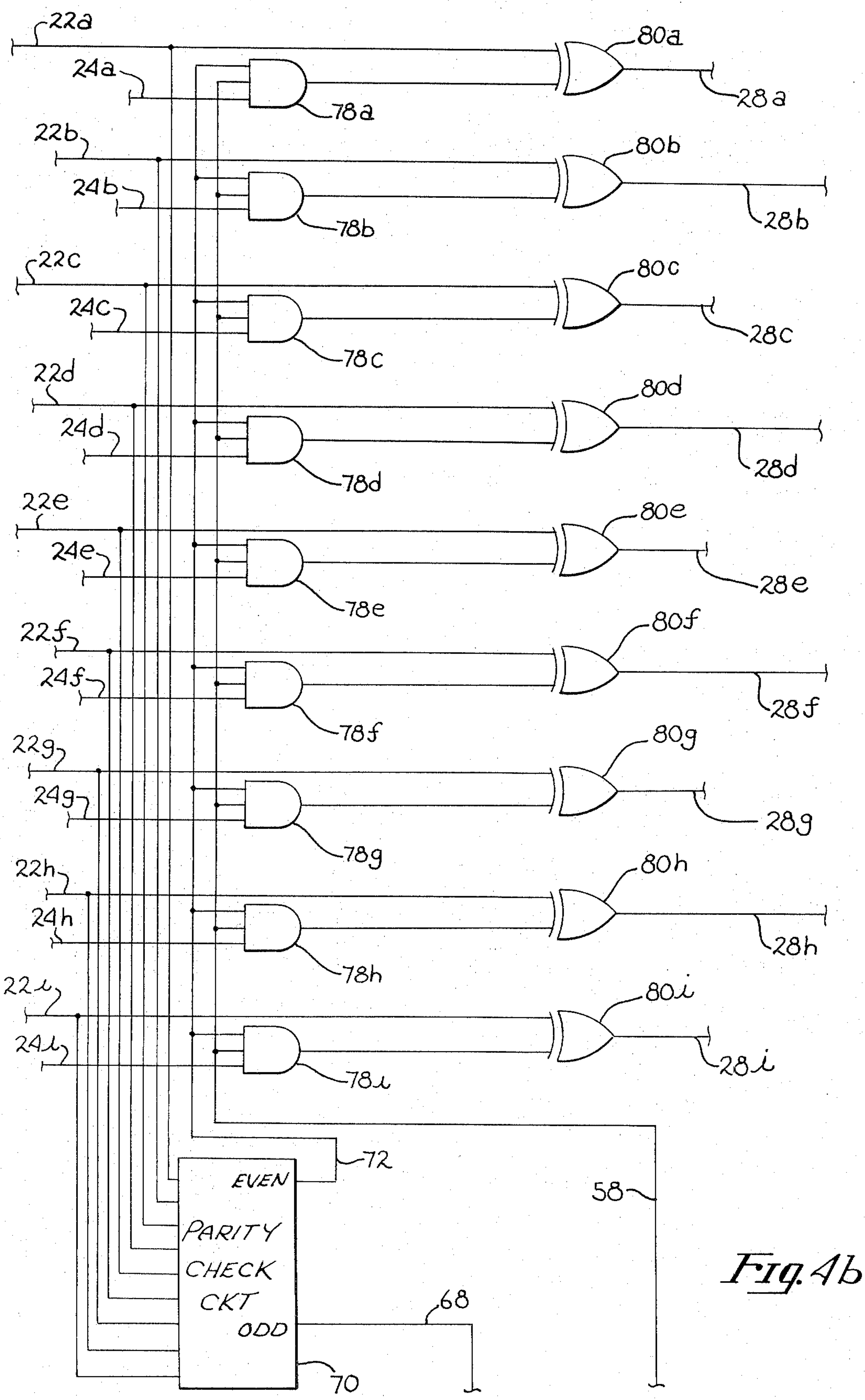
FIG. 4*b* is another portion of the present invention error correction logic.

Now referring to FIGS. 4*a* and 4*b*, a specific logic diagram for the error correction logic to achieve the above result may be seen. Certain of the inputs to the logic diagrams of the two figures are the same and the two diagrams more properly comprise a single overall logic circuit, specifically the error correction logic 26 of FIG. 1, but have been broken apart herein to separate the functional aspects and to provide greater clarity in the pictorial presentation. The logic shown is comprised of conventional positive logic elements, except as noted, and is designed to operate with the valid signals, that is, the signals appearing on line 24*a* through 24*i*, in a negative logic form, e.g., the zero, low or false state indicating a valid condition and a one, true or high state indicating a potentially invalid condition. For purposes of convenience, these signals will be hereafter referred to as the valid signals, it being understood that the term valid signals refers to a signal which may indicate a valid or invalid condition, depending upon its state.

The signals on lines 24*a* through 24*i* are each inverted by inverters 50*a* through 50*i* so that the output of the inverters is in the high state when the respective input indicates a valid condition. The outputs of the inverters are applied in groups of three to the NAND gates 52*a* through 52*c*, so that the output of the NAND gates is low only when all valid signals coupled thereto indicate a valid condition. Thus, when any valid signal coupled to a particular NAND gate through the respective inverter indicates an invalid condition, the output of the respective NAND gate will be in the high state.

The outputs of the three NAND gates 52*a* through 52*c* are coupled to NAND gates 54*a* through 54*c* in a particular manner so that the simultaneous occurrence of a high state output of any two of the NAND gates 52*a* through 52*c* may be sensed. Thus, AND gate 54*a* has as its inputs the outputs of NAND gate 52*a* and NAND gate 52*b* so that an invalid condition in one of signals 24*a* through 24*c* occurring simultaneously with an invalid condition in at least one of signals 24*d* through 24*f* will result in a high state output for AND gate 54*a*. Similarly, AND gate 54*b* provides a high state output when there is at least one error in signals 24*a* through 24*c* and one error in signals 24*g* through 24*i*, with AND gate 54*c* similarly providing a high state output upon the occurrence of at least one error in signals 24*d* through 24*f* and signals 24*g* through 24*i*. The signals from the AND gates 54*a* through 54*c* are applied to the NOR gate 56 which provides a high state output only if all inputs thereto are in the low state. Consequently, if one or more errors occur in at least two of any of the three groups of three valid signal inputs, the output of NOR gate 56 will be in the low state.

AND gates 60*a* through 60*i* are coupled in groups of threes to a respective group of three of lines 24. Specifically, AND gate 60*a* has as its input the signals on lines 24*a* and 24*b* and provides as its output a signal which is in the high state only if the signals on lines 24*a* and 24*b* indicate an invalid condition. Similarly, AND gate 60*b* is coupled to lines 24*a* and 24*c* and has a high state output only if the two input signals 24*a* and 24*c* indicate an invalid condition. AND gate 60*c* provides a similar function for the signals on lines 24*b* and 24*c*, so that if any two of the three valid signals on lines 24*a* through 24*c* indicate an invalid condition, the output of one of AND gates 60*a* through 60*c* will be in the high state, thereby causing the output of NOR gate 62*a* to be in the low state. The function of NOR gates 62*b* and 62*c* is similar, so that the three inputs to NAND gate 64 are all in the high state unless two of the valid signals in any one group of three signals on lines 24*a* through 24*i* indicate an invalid condition. Thus, the output of NAND gate 64 is in the low state unless such a double error occurs.

The output of NAND gate 64 is coupled to an input of NOR gate 56. Consequently, it may be seen that if two or more valid signals indicate an invalid condition, then two of such signals must either occur within one of the groups of three valid signals, thereby resulting in a high state output for one of AND gates 54*a* through 54*c*, or the two signals indicating an invalid condition must occur in different groups of three valid signals, thereby resulting in a high state output for NAND gate 64. Thus, if any two or more valid signals indicate an invalid condition, at least one of the inputs of NOR gate 56 must necessarily be in the high state, resulting in a low state output for NOR gate 56 appearing on line 58. Thus, line 58 will be in the low state if any two or more valid signals indicate an invalid condition, and will be in the high state if no more than one valid signal indicates an invalid condition (a negative logic indication of a double error).

The outputs of NAND gates 52*a* through 52*c* are also coupled to the inputs of NOR gate 66. As previously explained, the outputs of these NAND gates are in the low state only when all of the valid signals coupled thereto through the respective inverters indicate a valid condition, and, thus, the output of NOR gate 66 may be in the high state only when all of the valid signals indicate a valid condition. In addition, however, it may be seen that a further input signal on line 68 is provided to NOR gate 66 so that this signal too must be in the low state before the output of the NOR gate may be in the high state.

Now referring to FIG. 4*b*, it may be seen that the nine informational signals, that is eight data signals and a parity signal on lines 22*a* through 22*i*, are coupled to a parity check circuit 70 of conventional design which provides an output signal on line 68 which is in the low state when parity does not check and is in the high state when parity checks (the output on line 72 is the inverse of the output on line 68). Thus, all the inputs to NOR gate 66 will be in the low state only if all valid signals indicate a valid condition and at the same time the parity check conducted on the nine informational signal lines 22*a* through 22*i* does not check. Thus, the signal on line 30, identified as a machine check signal, is in the high state only when this condition occurs, indicating a particular type of double error (specifically, a double error occurring on one card, one of which errors occurs in the informational signal on the respective one of lines 22*a* through 22*i*, and the other of which prevents the identification of the specific card on which the error occurred by providing a card parity check indicated by the valid signal from that card). Thus, a high state signal on line 30 indicates an apparent single error in the eight bit data signal which is not correctable since the error results from a double error on one of the cards. Also, when the signal on line 30 is high, the output of inverter 74 is low, thereby automatically causing the output of AND gate 76 appearing on line 32 to be in the high state indicating the double error. Similarly, as previously described, the output on line 58 is in the high state if no more than one valid signal indicates an invalid condition and changes to the low state when two or more valid signals indicate an invalid condition, thereby also causing the output of NAND gate 76 on line 32 to be in the high state. Thus, the signal on line 32 is in the high state whenever, first, two or more valid signals indicate an invalid condition, and, secondly, whenever none of the valid signals indicate an invalid condition but the data parity check is bad, this latter condition further giving a machine check signal on line 30 so that these two conditions may be distinguished.

Now referring to FIG. 4*b*, it will be seen that a plurality of AND gates 78*a* through 78*i* each have coupled thereto the negative logic signal on line 58 indicating two or more valid signals are in the invalid condition, the parity check signal on line 72 which is in the high state when parity is bad, and the respective one of the valid signals on lines 24*a* through 24*i*. Thus, when parity of the informational signals on lines 22*a* through 22*i* is bad, and the signal on line 58 indicates that there are not two or more valid signals indicating an invalid condition, the output of each of the AND gates will be in the low state except for the one AND gate which receives an invalid condition signal on the respective one of lines 24*a* through 24*i*. Thus, it may be seen that the output of the AND gates 78*a* through 78*i* will all be in the low state unless parity of the informational signals does not check and there is one and only one valid signal indicating an invalid condition, in which case only the output for the AND gate receiving the invalid condition signal will be in the high state.

The feature of the logic elements 80*a* through 80*i* is such that the logic signals appearing on the input lines 22*a* through 22*i* thereto are passed to the outputs 28*a* through 28*i* whenever the second input, that is, the respective one of the outputs of AND gates 78*a* through 78*i* is in the low state, but is inverted for presentation at the outputs 28*a* through 28*i* when the output of the AND gate 78*a* through 78*i* is in the high state. Thus, in the above-described condition where parity does not check and one valid signal indicates an invalid condition, the informational signal on the respective one of lines 22*a* through 22*i* is effectively inverted by the corresponding element 80 so as to correct the invalid signal.

Thus, it may be seen that the results of the present invention outlined in the preceding table are accomplished by the specific logic circuit herein described in detail. It may be seen that all single errors occurring in a byte, that is, an eight bit data signal and a parity signal associated therewith, are automatically corrected, and all double errors which may effect the accuracy of the byte are noted for whatever action may be appropriate in the particular system. With respect to a particular application, specifically a memory system, some of the advantages of the present invention over conventional Hamming codes are readily apparent. First of all, a typical Hamming code will not detect double errors. Second of all, greater manipulation of the digital information is required by Hamming codes so as to effectively increase the memory access time required. Also, for an eight bit data signal a simple Hamming code would require at least four additional bits, thereby requiring at least one-third of the memory capacity merely for storage of the Hamming code bits. In the present invention, as herein described for an eight bit byte, it may be seen that one memory card, constituting one-ninth of the total memory capacity, is devoted to storage of the parity signal for the eight bit byte (which may be desirable, even if a Hamming code is used, but is not included in the above four bit allowance for the code). In addition, the data storage capacity of the eight data memory cards is reduced by the provision of one parity bit for each 16 data bits on these cards. Therefore, the fractional memory capacity devoted to the provision of sufficient bits to correct all single errors and detect all double errors in accordance with this particular embodiment of the present invention is $1/9 + (8/9)(1/17)$ or approximately 16.3 percent. Thus, it may be seen that by utilizing the present invention instead of a simple Hamming code, faster memory access may be achieved, double errors may be detected, and a parity bit is provided for further use in the system, and yet the data which may be stored in a memory of a given size has been increased by 25 percent. If the present invention is compared to a system using a Hamming code of four bits plus a parity bit for each eight bit byte, the increase in useful data storage, using the present invention, is greater than 35 percent.

The present invention has been described in detail herein with respect to a computer memory system and, in fact, with a computer memory system having a specific organization. It is to be noted, however, that the organization of each memory card, instead of being specifically shown in FIG. 2, may be more generally characterized as having an organization whereby the memory is addressable essentially in two stages: First, partially address the memory so as to address a plurality of memory locations which have stored therein a lesser plurality of data bits and at least one additional bit for checking the data bits (a parity check in the system described herein, though other check bits could be provided, such as, by way of example, a Hamming code which would not require excessive memory capacity if the number of data bits partially addressed is sufficiently large, e.g., approximately 26 or more, since the number of Hamming bits required does not increase proportionately with the number of data bits to be examined by the code). Secondly, further addressing the plurality of bits to provide one or more data bit outputs each having a second output signal associated therewith indicating the potential veracity of the data signal associated therewith. Also, though tbe invention is particularly advantageous when used in conjunction with a memory system as herein described, it may also be used in any digital application wherein a first plurality of digital signals are to be selected from a second much larger group of digital signals, wherein the second group of signals may include sub-groups of signals together with one or more check bits therein, which subgroups are larger than the first groups to be selected therefrom. Also, while a particular logic circuit has been described in detail for practicing the present invention, one skilled in the art of digital equipment design may readily design other logic circuits to realize and practice the present invention. Thus, while the present invention has been shown and described herein with reference to a preferred embodiment thereof, it will be understood by those skilled in the art that various changes in form and details may be made therein without departing from the spirit and scope of the invention.

I claim:

1. Apparatus for detecting and correcting errors occurring in desired digital signals having a first plurality of data bits and a parity bit associated therewith comprising:

in plurality, means for selecting a second plurality of digital signals from a greater plurality of digital signals, each of said second plurality of digital signals having therein a parity check bit which may be used to check the parity of the remainder of each of said second plurality of digital signals;

in plurality, means for checking the parity of said second plurality of digital signals and for providing a valid signal indicative of the results of the parity check;

in plurality, means for selecting one bit of said desired digital signal from each of said second plurality of digital signals, whereby all of said data bits and said parity bit of said desired digital signal are selectable by the plurality of said last named means;

means for providing a parity check on said desired digital signal and for providing a parity check signal indicative of the results of the parity check;

means for sensing the simultaneous occurrence of a failure to obtain a parity check as indicated by said parity check signal and a single valid signal indicating the failure to obtain a parity check in said respective one of said second plurality of digital signals, and for providing an output in response thereby;

means responsive to the output of said last named means for inverting the bit of said desired digital signal selected from the one of said second plurality of digital signals for which said valid signal indicates a failure to obtain a parity check; and means for providing an output signal indicative of the occurrence of at least two of said valid signals indicating failure to obtain a parity check in the respective ones of said second pluralities of digital signals.

2. The apparatus of claim 1 further comprised of a means for providing an output signal indicative of the occurrence of a failure to obtain a parity check in said desired digital signal when all of said valid signals indicate a parity check of said respective second pluralities of digital signals.

3. A means for detecting and correcting errors in digital information having a plurality of bits, one of which is a parity check bit for the remainder of said digital information accessed from a memory, comprising:

means for addressing said memory to provide a first plurality of digital signals and a parity check signal therefore;

means for performing a parity check on said first plurality of digital signals;

means for addressing said first plurality of digital signals to select one of said last named digital signals providing one bit of said digital information;

all of said previously named means being taken in plurality so as to be capable of collectively providing said plurality of bits of said digital information, each of said last named bits having a valid signal associated therewith indicative of the results of the parity check performed on the respective first plurality of digital signals;

means for performing a parity check on said digital information;

means for determining the simultaneous occurrence of a failure to obtain a parity check of said digital information and a failure to obtain a parity check of one of said first plurality of digital signals;

means for inverting the one of said digital signals selected from the one of said first plurality of digital signals on which a parity check was not obtained; and means for providing an output signal responsive to the occurrence of a failure to obtain a parity check in at least two of said first plurality of digital signals.

4. The apparatus of claim 3 further comprised of a means for providing an output signal responsive to the occurrence of a failure to obtain a parity check in said digital information when a parity check of each of said first plurality of digital signals is obtained.

* * * * *